United States Patent
Trautmann et al.

(10) Patent No.: US 9,245,232 B1
(45) Date of Patent: Jan. 26, 2016

(54) MACHINE GENERATED SERVICE CACHE

(71) Applicant: Amazon Technologies, Inc., Seattle, WA (US)

(72) Inventors: Tyson Christopher Trautmann, Seattle, WA (US); Peter Varnum Commons, Issaquah, WA (US); Diwakar Chakravarthy, Kirkland, WA (US); Michael Luis Collado, Seattle, WA (US); Thomas Lowell Keller, Renton, WA (US); Benjamin Warren Mercier, Issaquah, WA (US); Zachary Jared Wiggins, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 248 days.

(21) Appl. No.: 13/774,767

(22) Filed: Feb. 22, 2013

(51) Int. Cl.
*G06N 5/00* (2006.01)
*G06F 1/00* (2006.01)
*G06N 99/00* (2010.01)

(52) U.S. Cl.
CPC .................. *G06N 99/005* (2013.01)

(58) Field of Classification Search
CPC ........... G06N 5/04; G06N 5/02; G06N 7/005; G06Q 50/01
See application file for complete search history.

(56) References Cited

U.S. PATENT DOCUMENTS

| 6,779,030 B1 * | 8/2004 | Dugan et al. .................. 709/223 |
| 7,802,264 B2 * | 9/2010 | Robertson et al. ............ 709/215 |
| 2013/0031035 A1 * | 1/2013 | Jeanne et al. .................. 706/12 |

* cited by examiner

*Primary Examiner* — Jeffrey A Gaffin
*Assistant Examiner* — Kalpana Bharadwaj
(74) *Attorney, Agent, or Firm* — Lee & Hayes, PLLC

(57) ABSTRACT

A machine generated service cache that utilizes one or more machine learning classifiers is trained using service requests directed to a human-generated service and service responses generated by the human-generated service in response to the service requests. Once the machine generated service cache has been trained to a predetermined level of performance, the machine generated service cache can be utilized to process actual service requests directed to the human-generated service. The machine generated service cache might be utilized to process service requests for which it is not essential that the returned service response be identical to a response that would be generated by the human-generated service.

22 Claims, 12 Drawing Sheets

MACHINE GENERATED SERVICE CACHE TRAINING

MACHINE GENERATED SERVICE CACHE

BACKGROUND

Large-scale dynamic World Wide Web ("Web") sites commonly implement many different types of services for providing many different types of functionality. Some of these types of services can be very costly to implement and operate. Moreover, it may also be difficult and expensive to provide a backup to some of these types of services.

In order to reduce the operational load on certain types of services, and therefore improve application performance, some large-scale dynamic Web sites also utilize one or more service caches. A service cache is utilized to cache the results of service requests generated by an associated service. A traditional service cache will return accurate results for service requests that are identical to previously received requests. However, such a service cache cannot typically return any results for requests that are different than previous requests. Therefore, a service cache may be of limited value in improving application performance and backing up a service if the service cache miss rate is high.

It is with respect to these and other considerations that the disclosure made herein is presented.

DETAILED DESCRIPTION

Figure 1:
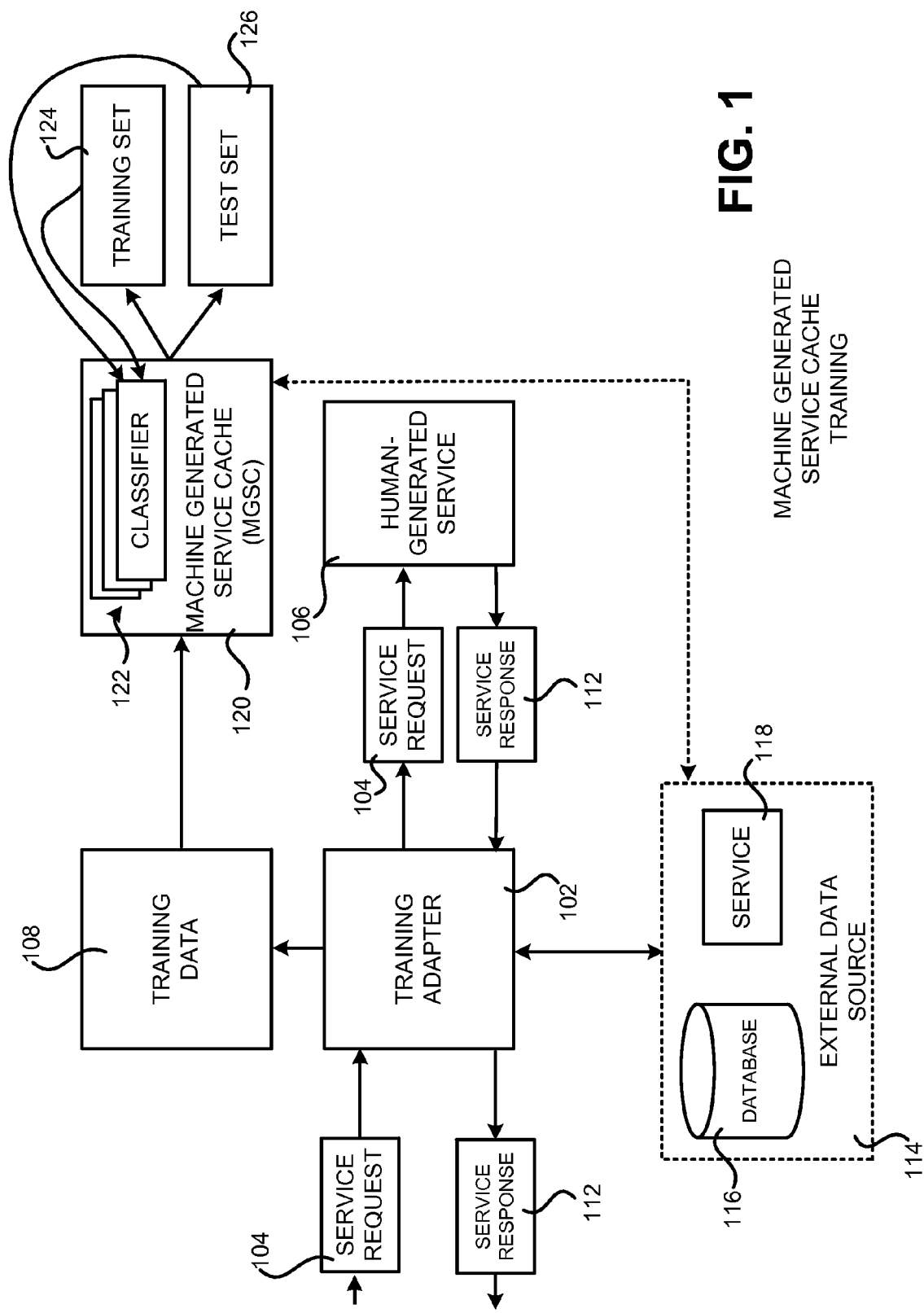
FIG. 1 is a system diagram showing aspects of one mechanism presented herein for creating and utilizing a machine generated service cache in conjunction with a human-generated service, according to one embodiment disclosed herein.

The following detailed description is directed to technologies for creating and utilizing a machine generated service cache (which may be referred herein to as a "MGSC"). Through an implementation of the concepts and technologies disclosed herein, a MGSC can be trained to provide responses to service requests directed to a human-generated service. Once the MGSC has been trained in this manner, the MGSC can be utilized to process actual requests directed to the human-generated service. As compared to a traditional service cache, a MGSC can provide a response to every service request. The responses generated by the MGSC, however, might not always be accurate. Nonetheless, inaccurate results might be acceptable for many types of service requests, such as for example, a service request that is directed to a human-generated service that is unavailable, a service request for which an inaccurate response is acceptable, a service request that is not human generated and, potentially, for other types of service requests.

According to aspects presented herein, a MGSC can be trained to respond to service requests directed to a human-generated service. In order to train the MGSC, a training adapter is utilized in one embodiment. The training adapter is utilized to receive a service request (which might be referred to herein as "a request" or "requests") intended for a human-generated service. A human-generated service is a service that has been programmed by a human being to perform its intended functionality. A human-generated service typically receives a service request containing one or more input values, performs some type of processing on the input values to generate one or more output values, and provides the output values in a service response to the service request.

The training adapter utilizes the received service requests and service responses to create training data for use in training one or more machine learning classifiers (which may be referred to herein as a "classifier" or "classifiers") utilized by the MGSC. As known in the art, a classifier is a software component that can learn from provided input. The MGSC might utilize a single classifier or utilize multiple classifiers in combination. Examples of classifiers include, but are not limited to, classifiers that implement decision trees/forests, naïve Bayes, K-nearest neighbor, and/or support vector machine ("SVM") algorithms. Other types of classification algorithms might also be utilized.

The training adapter is also configured to provide each service request to the human-generated service, and to receive a service response from the human-generated service for each request. The training adapter extracts the input values from each service request and the output values from each corresponding service response. The training adapter then creates a new instance of training data using the extracted input and output values. The training adapter might also include data values retrieved from one or more external services in the training data.

In one implementation, the training adapter utilizes a service contract exposed by the human-generated service in order to extract the input values and the output values. As known in the art, a service contract provides details regarding the functionality provided by a service, such as but not limited to, information describing the type of service, functional requirements of the service such as the methods exposed by the service and invocation details for the methods, and non-functional requirements such as security constraints, a service level agreement ("SLA"), and operational semantics. A service contract might also provide other, or different information.

The training adapter is also configured to periodically provide the training data to the MGSC for training. The training data is then split into a training set and a test set in one embodiment. The training set is utilized to train the classifiers of the MGSC. As mentioned above, a single classifier or a combination of classifiers might be utilized. Additionally, various individual classifiers and combinations of classifiers might be trained and tested in order to identify the classifier, or combination of classifiers, that provide the highest level of performance. The test set is utilized to evaluate the performance of the classifiers utilized by the MGSC.

Once the MGSC has been trained to a predetermined level of performance, the MGSC can be utilized to process actual service requests intended for the human-generated service. In one implementation, an input translator is configured to receive service requests intended for the human-generated service. The input translator may utilize the service contract exposed by the human-generated service in order to expose an external interface that is compatible with the interface exposed by the human-implemented service and to extract input values from the received service requests. The input translator provides the extracted input values to the MGSC as inputs to the trained classifier, or combination of classifiers.

An output translator is also provided that receives classifier outputs from the classifier, or combination of classifiers, that have been generated based upon the received input values. The output translator then generates a response to the received service request utilizing the classifier outputs. The output translator may utilize the service contract exposed by the human-generated service in order to generate a service response that is compatible with the interface exposed by the human-generated service. In this way, the MGSC can masquerade as the human-generated service in order to process service requests directed to the human-generated service. As mentioned above, the responses generated by the MGSC may not always be the same as the responses that would be generated by the human-generated service. As a result, the MGSC might be utilized in conjunction with service requests where an inaccurate response is acceptable.

In order to route appropriate service requests to the MGSC, a routing component is utilized in some embodiments. The routing component might be a proxy, load balancer, or another type of component configured to route service requests to either the MGSC, the human-generated service, or both, depending upon the type of service request received. For example, and as mentioned briefly above, the routing component may be configured to route service requests to a MGSC when the corresponding human-generated service is unavailable (i.e. some response is better than no response), when an inaccurate response is acceptable to the caller, and when the service request has not been generated by a human (e.g. the search request has been generated by a search crawler or other type of software robot) and, potentially, for other types of service requests. The routing component might also be configured to route a service request to the MGSC if routing the service request to the human-generated service requires a network call and routing the service request to the MGSC does not require a network call.

In some embodiments, the MGSC can also be utilized to locate anomalies in the operation of the corresponding human-generated service. For example, either all requests to the human-generated service or a sampled subset of the requests can be routed through both the MGSC and the human-generated service. Any differences identified between the results returned by both services can be utilized in an attempt to identify targeted areas where the human-generated service may, or may not, be returning incorrect data. Similarly, when a new version of the human-generated service is released, the new version can be tested against the MGSC trained on the previous version of the human-generated service. Any differences identified between responses returned by the MGSC service and the old version of the human-generated service can be used as a baseline to identify areas where the new version of the human-generated service has gotten better or worse against values that the MGSC is predicting. A MGSC might also be utilized to locate other types of anomalies in the operation of a human-generated service. Additional details regarding these and other aspects of the embodiments disclosed herein will be provided below with regard to FIGS. 1-9.

It should be appreciated that the embodiments disclosed herein might be utilized with any type of computer, computing system, device, application program, service, operating system, or other type of system or component. Accordingly, although the embodiments disclosed herein are primarily presented in the context of services, the disclosure presented herein is not limited to such an implementation. For example, the concepts disclosed herein might be utilized to create other types of machine learning generated program components that are trained to respond to requests directed to other types of human-generated program components. The embodiments disclosed herein, therefore, should not be limited to use with services.

It should be also appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 2:
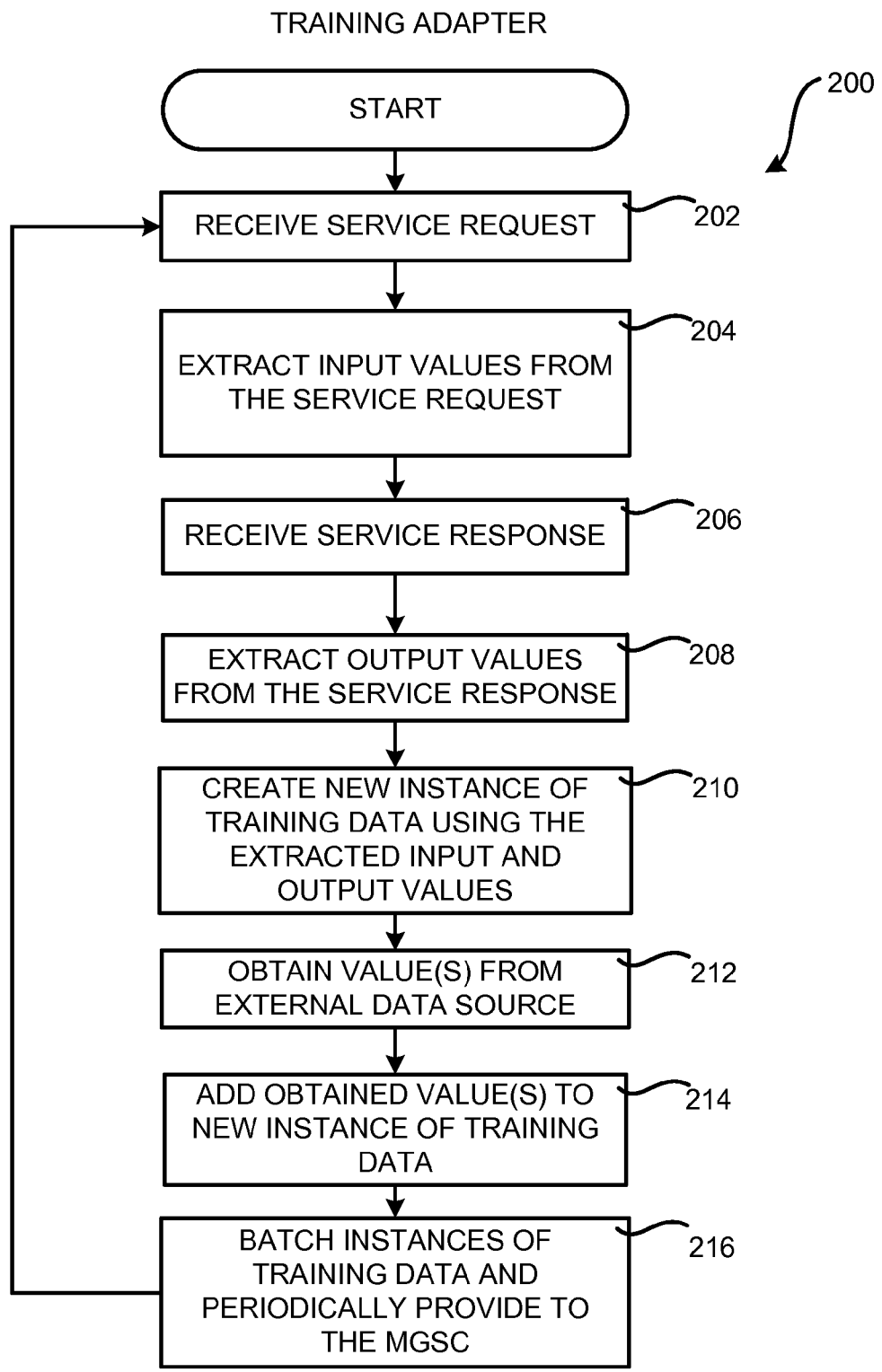
FIG. 2 is a flow diagram showing one illustrative routine that shows aspects of the operation of a training adapter utilized in training a machine generated service cache, according to one embodiment disclosed herein.
Figure 3:
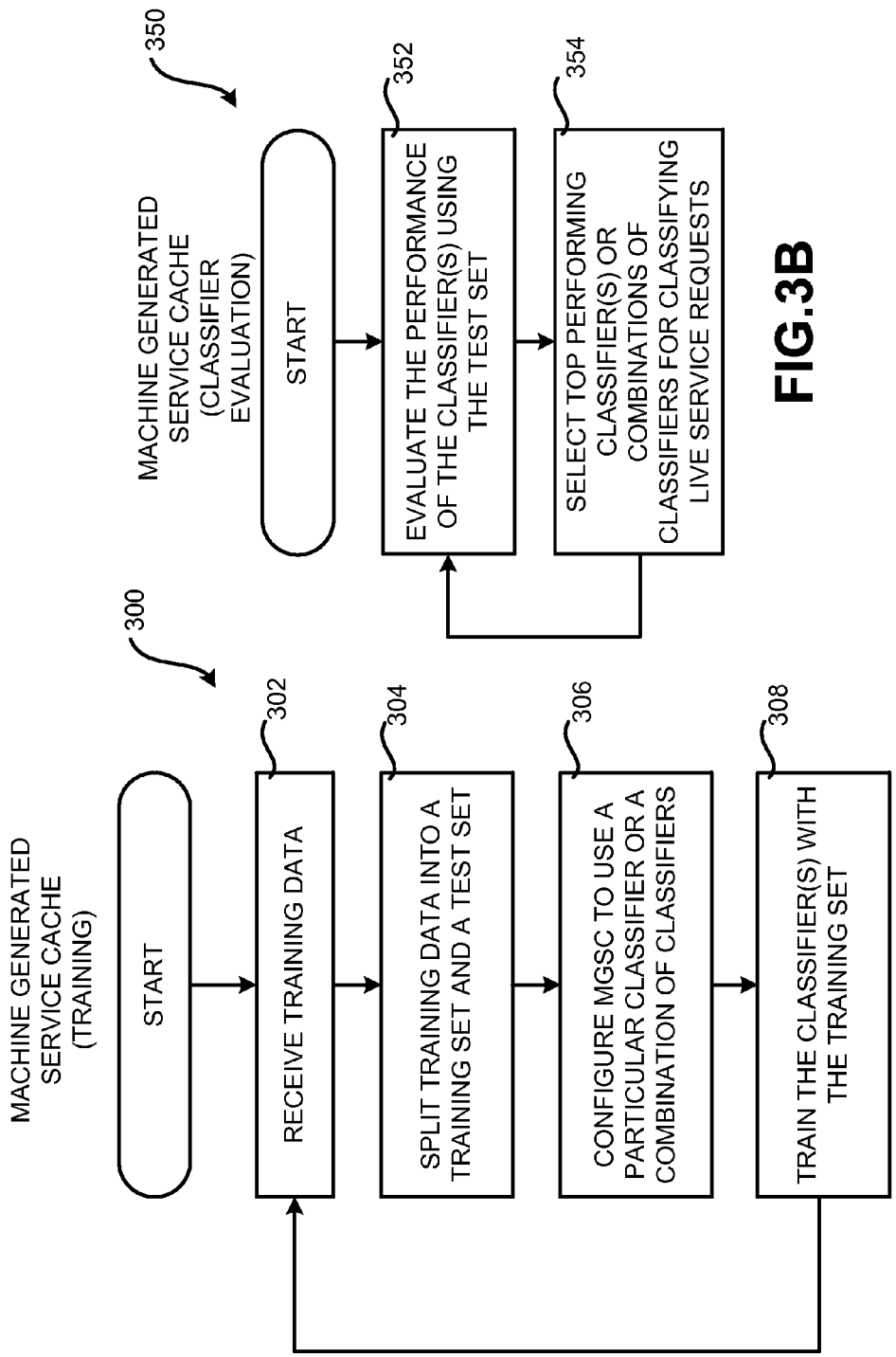
FIG. 3A is a flow diagram showing one illustrative routine that shows aspects of one mechanism for training classifiers utilized by a machine generated service cache, according to one embodiment disclosed herein.
FIG. 3B is a flow diagram showing one illustrative routine that shows aspects of one mechanism for evaluating the performance of one or more classifiers utilized by a machine generated service cache, according to one embodiment disclosed herein.

FIG. 1 is a system diagram showing aspects of one mechanism presented herein for creating and utilizing a MGSC 120 in conjunction with a human-generated service 106, according to one embodiment disclosed herein. In particular, FIG. 1 illustrates aspects of the training of the MGSC 120 to process service requests 104 directed to the human-generated service 106 and to generate responses to such requests 104. FIGS. 2, 3A, and 3B, described below, provide additional details regarding the training of the MGSC 120.

As shown in FIG. 1, and mentioned briefly above, a training adapter 102 is utilized in one embodiment to generate training data 108 that is suitable for use in training the MGSC 120. In order to generate the training data 108, the training adapter 108 receives some or all of the service requests 104 intended for a human-generated service 106. As mentioned above, the human-generated service 106 is a service that has been programmed by a human being to perform its intended functionality. A human-generated service 106 typically receives a service request 104 from a calling client that contains one or more input values, performs some type of processing on the input values to generate one or more output values, and provides the output values in a service response 112 to the service request 104. As mentioned above, the technologies disclosed herein might also be utilized to train and utilize another type of machine learning generated software component that can process requests directed to program components other than services.

In one particular implementation, the training adapter 102 utilizes the received service requests 104 and service responses 112 to create training data 108 for use in training one or more classifiers 122 utilized by the MGSC 120. As described briefly above, a classifier is a software component that can learn from provided input. The MGSC 120 might utilize a single classifier 122 or utilize multiple classifiers 122 in combination. Examples of classifiers 122 include, but are not limited to, classifiers that implement decision trees/forests, naïve Bayes, K-nearest neighbor, and/or SVM algorithms. Other types of classification algorithms might also be utilized.

The training adapter 102 is also configured in one embodiment to provide each service request 104 to the human-generated service 106, and to receive a service response 112 from the human-generated service 106 corresponding to each request 104. The training adapter 102 extracts input values from each service request 104 and output values from each corresponding service response 112. The training adapter 102 then creates a new instance of training data 108 using the extracted input and output values. The training adapter 102 might also include data values retrieved from one or more external data sources 114, such as another service 118 or a database 116, in the training data 108. In some embodiments, the MGSC 120 might retrieve data values directly from the external data sources 114, such as the service 118 or the database 116. The data values retrieved from the database 116 and/or the service 118 might be data utilized by the human-generated service 106 to process service requests 104 or other types of data.

In one implementation, the training adapter 102 utilizes a service contract exposed by the human-generated service 106 in order to extract the input values and the output values from the service requests 104 and the service responses 112, respectively. As known in the art and discussed briefly above, a service contract provides details regarding the functionality provided by the human-generated service 106, such as but not limited to, information describing the type of the service 106, functional requirements of the service 106 such as the methods exposed by the service 106 and invocation details for the methods, and non-functional requirements such as security constraints, SLA details, and other operational semantics. The service contract might also provide other, or different information, in other embodiments.

The training adapter 102 is also configured to periodically provide the training data 108 to the MGSC 120 for training of the classifier 122, or classifiers 122. The training data 108 is then split into a training set 124 and a test set 126 in one embodiment. The training set 124 is utilized to train the classifier 122, or classifiers 122, utilized by the MGSC 120. As mentioned above, a single classifier 122 or a combination of classifiers 122 might be utilized. Additionally, various individual classifiers 122 and combinations of classifiers 122 might be trained and tested in order to identify the classifier 122, or combination of classifiers 122, that provide the highest level of performance.

The test set 126 is utilized to evaluate the performance of the classifier 122, or classifiers 122, utilized by the MGSC 120. Once the classifier 122, or classifiers 122, utilized by the MGSC 120 have been trained to a predetermined level of performance, the MGSC 120 can be utilized to process actual service requests 104 intended for processing by the human-generated service 106 and to generate a service response 112 to the requests 104. Additional details regarding the training of the classifier 122, or classifiers 122, utilized by the MGSC 120 will be provided below with regard to FIG. 2, FIG. 3A, and FIG. 3B. Additional details regarding the processing of actual service requests 104 by the MGSC 120 will be provided below with regard to FIGS. 4-6B.

It should be appreciated that while the embodiment shown in FIG. 1 includes a single MGSC 120 being trained on training data from a single human-generated service 106, a MGSC 120 might be configured to support multiple human generated services 106 in other embodiments. In these embodiments, a single MGSC 120 might partition the classifiers 122 on a per human-generated service basis. In this way, a single MGSC 120 might be trained to classify service requests 104 for multiple human generated services 106.

Turning now to FIG. 2, additional details will be provided regarding the training of the MGSC 120 to process service requests 104 directed to a human-generated service 106. In particular, FIG. 2 is a flow diagram showing one illustrative routine 200 that shows aspects of the operation of the training adapter 102 utilized in training the MGSC 120 in one embodiment disclosed herein. It should be appreciated that other implementations might utilize other components to train the operation of the MGSC 120.

It should also be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGS. are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 200 begins at operation 202, where the training adapter 102 receives a service request 104 directed toward the human-generated service 106. In response to receiving such a service request 104, the routine 200 proceeds to operation 204, where the training adapter 102 extracts one or more input values from the service request 104. As mentioned above, the training adapter 102 might utilize aspects of a service contract exposed by the human-generated service 106 in order to receive the service request 104 and to extract the input values from the service request 104. The training adapter 102 also provides the service request 104 to the human-generated service 106 for processing.

From operation 204, the routine 200 proceeds to operation 206, where the training adapter receives a service response 112 from the human-generated service 106. In response thereto, the routine 200 proceeds from operation 206 to operation 208, where the training adapter 102 extracts outputs values from the service response 112. As also mentioned above, the training adapter 102 might also utilize aspects of the service contract exposed by the human-generated service 106 to identify and extract the output value, or values, contained in the service response 112.

From operation 208, the routine 200 proceeds to operation 210, where the training adapter 102 creates a new instance of training data 108 utilizing the input values extracted from the service request 104 at operation 204 and the output values extracted from the service response 112 at operation 208. For example, the training adapter 102 might generate a new row in a table of training data 108 that includes the input values and output values.

In some particular implementations, the training adapter 102 might also be configured to retrieve data values from one or more external data sources 114 for inclusion in the new instance of training data 108. For example, at operation 212, the training adapter 102 might retrieve one or more data values from a database 116 or another service 118 for inclusion in the new instance of training data 108. The training adapter 102 adds the obtained values to the new instance of training data 108 at operation 214. As also mentioned above, the MGSC 120 might retrieve these values directly from the database 116 or service 118 in other embodiments.

From operation 214, the routine 200 proceeds to operation 216, where the training adapter 102 periodically provides the training data 108 to the MGSC 120 for use in training the classifier 122, or classifiers 122. In other embodiments, the training adapter 102 might be configured to provide the new instance of training data 108 to the MGSC 120 in real-time or in near-real time. The training data 108 might also be provided to the MGSC 120 according to other time schedules in other embodiments. From operation 216, the routine 200 proceeds back to operation 202, described above, where additional training data 108 might be generated from additional service requests 104 in the manner described above.

FIG. 3A is a flow diagram showing one illustrative routine 300 that shows aspects of one mechanism for training the MGSC 120, according to one embodiment disclosed herein. The routine 300 begins at operation 302, where the MGSC 120 receives the training data 108 from the training adapter 102. The routine 300 then proceeds from operation 302 to operation 304, where the training data 108 is split into a training set 124 and a test set 126. The training adapter 102, the MGSC 120, or another component might split the training data 108 in this manner. Once the training data 108 has been split into the training set 124 and the test set 126, the routine 300 proceeds from operation 304 to operation 306.

At operation 306, the MGSC 120 is configured to utilize a single classifier 122 or a combination of classifiers 122. As mentioned above, various classifiers 122 and/or combinations of classifiers 122 may be trained on the training set 124 until a classifier 122, or classifiers 122, having the highest performance is identified. In order to perform this functionality, the routine 300 proceeds from operation 306 to operation 308, where the classifier 122, or classifiers 122, of the MGSC 120 are trained using the instances of training data 108 contained in the training set 124. The routine 300 then proceeds back to operation 302, where the classifier 122, or classifiers 122, may be trained on additional instances of training data 108.

FIG. 3B is a flow diagram showing one illustrative routine 350 that shows aspects of one mechanism for evaluating the performance of one or more classifiers 122 the instances of the training data 108 contained in the test set 126, according to one embodiment disclosed herein. The routine 350 begins at operation 310, where the performance of one or more classifiers 122 is evaluated using the test set 126.

From operation 352, the routine 350 proceeds to operation 354, where the top performing classifier 122, or combination of classifiers 122, is selected for classifying live service requests 104 directed to the human-generated service 106. As mentioned above, the MGSC 120 might be put into service responding to live service requests 104 once the MGSC 120 can correctly classify a certain predefined percentage of the instances of training data 108 contained in the training set 124. An administrator or operator of the MGSC 120 might specify the predefined percentage. From operation 354, the routine 350 proceeds back to operation 352, where the performance of other classifiers 122 and/or combinations of classifiers 122 might be evaluated in the manner described above.

Figure 4:
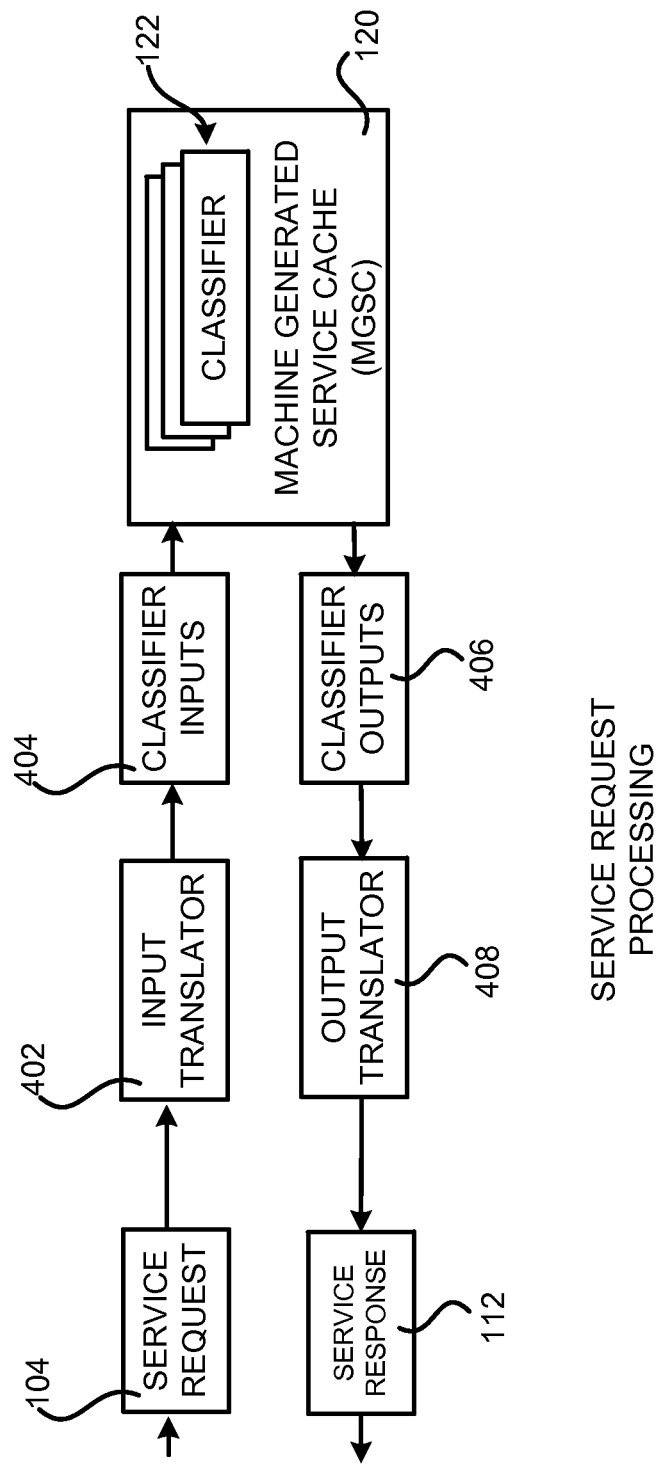
FIG. 4 is a system diagram showing aspects of one mechanism presented herein for utilizing a machine generated service cache to process service requests directed to a human-generated service, according to one embodiment disclosed herein.

FIG. 4 is a system diagram showing aspects of one mechanism presented herein for utilizing a MGSC 120 to process service requests 104 directed to a human-generated service 106, according to one embodiment disclosed herein. As discussed briefly above, once the MGSC 120 has been trained to a predetermined level of performance, the MGSC 120 can be utilized to process actual service requests 104 sent to the human-generated service 120. Details regarding the processing of the actual service requests 104 by the MGSC 120 in one embodiment are provided below.

As shown in FIG. 4, an input translator 402 is utilized in one embodiment to receive service requests 104 intended for the human-generated service 106. In order to provide this functionality, the input translator 402 may utilize the service contract exposed by the human-generated service 106 in order to expose an external interface that is compatible with the interface exposed by the human-generated service 106. The input translator 402 might also utilize the service contract to extract input values from the received service requests 104. The input translator 402 provides the extracted input values to the MGSC 120 as classifier inputs 404 to the trained classifier 122, or combination of classifiers 122.

In the embodiment shown in FIG. 4, an output translator 408 is also provided that receives classifier outputs 406 from the classifier 122, or combination of classifiers 122, that have been generated based upon the received input values as specified in the classifier inputs 404. The output translator 408 then generates a response 112 to the received service request 104 utilizing the classifier outputs 406. The output translator 408 might utilize the service contract exposed by the human-generated service 106 in order to generate a service response 112 that is compatible with the interface exposed by the human-generated service 106. It should be appreciated that the input translator 402 and/or the output translator 408 might be integrated with the MGSC 120 in some implementations.

In the manner shown in FIG. 4 and described above, the MGSC 120 can be utilized to process service requests 104 directed to the human-generated service 106. As mentioned above, the responses 112 generated by the MGSC 120 may not always be the same as the responses 112 that would be generated by the human-generated service 106. As a result, the MGSC 120 might be utilized in conjunction with service requests 104 where an inaccurate response 112 is acceptable. Details regarding several types of service requests 104 for which an inaccurate response 112 might be acceptable are described below with regard to FIG. 6.

Figure 5:
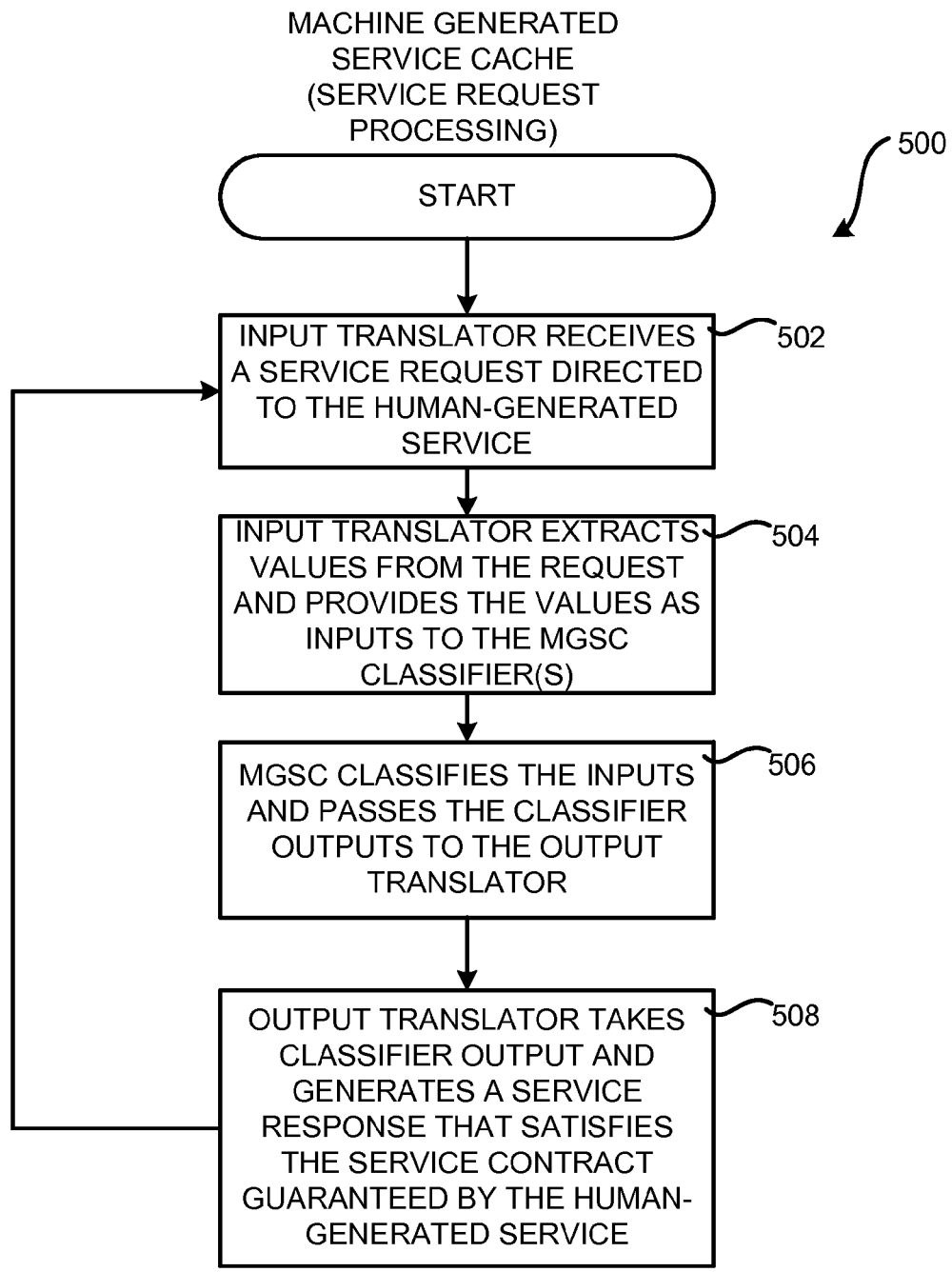
FIG. 5 is a flow diagram showing aspects of one illustrative routine for utilizing a machine generated service cache to process service requests directed to a human-generated service, according to one embodiment disclosed herein.

FIG. 5 is a flow diagram showing aspects of one illustrative routine 500 for utilizing a MGSC 120 to process service requests 104 directed to a human-generated service 106, according to one embodiment disclosed herein. The routine 500 begins at operation 502, where the input translator 402 receives a service request 104 in one embodiment disclosed herein. In response to the input translator 402 receiving a service request 104 at operation 502, the routine 500 proceeds to operation 504.

At operation 504, the input translator 402 extracts the input values from the service request 104. As mentioned above, the input translator 402 might utilize the service contract specified by the human-generated service 106 to identify the input values in the service request 104. Once the input translator 402 has identified the input values, the input translator 402 provides the input values to the MGSC 120 as classifier inputs 404. From operation 504, the routine 500 proceeds to operation 506.

At operation 506, the classifier 122, or classifiers 122, of the MGSC 120 classifies the classifier inputs 404. In response thereto, the MGSC 120 provides the classifier outputs 406 to the output translator 408. The output translator 408 receives the classifier outputs 406 at operation 508. The output translator 408 utilizes the classifier outputs 406 to generate a service response 112 that satisfies the service contract guaranteed by the human-generated service 106.

The output translator 408 also returns the service response 112 in response to the service request 104 at operation 508. From operation 508, the routine 500 proceeds back to operation 502, where additional service requests 104 might be processed in the manner described above. It should be appreciated that the MGSC 120 might be continually trained and evaluated in the manner described above with regard to FIGS. 1-3B while processing actual service requests 104 as shown in FIGS. 4 and 5 and described above.

Figure 6A:
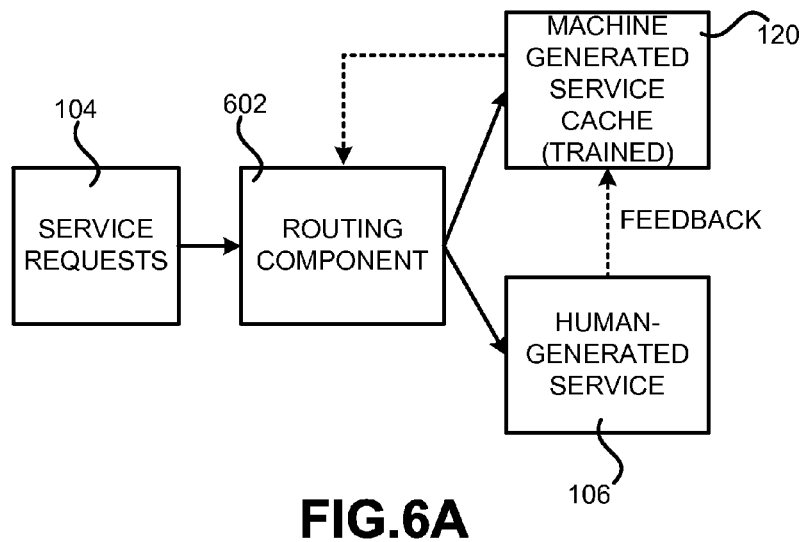
FIGS. 6A-6D are system diagrams showing aspects of the operation of a routing component for routing service requests to a machine generated service cache and/or a human-generated service, according to one embodiment disclosed herein.
Figure 6B:
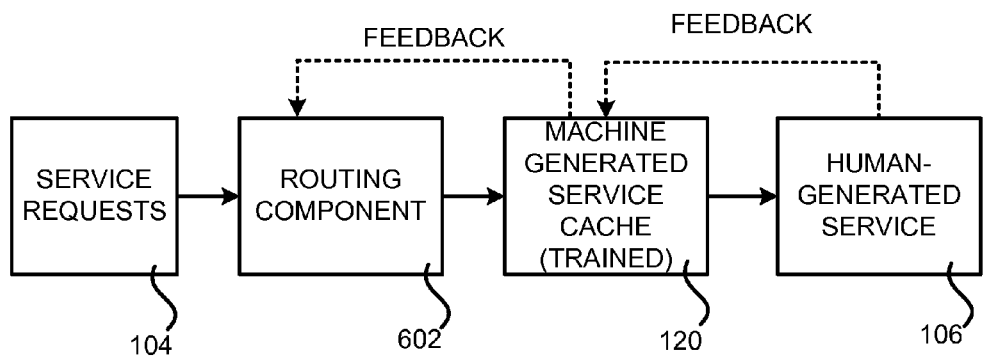

FIGS. 6A and 6B are system diagrams showing aspects of the operation of a routing component 602 for routing service requests 104 to a MGSC 120 and/or a human-generated service 106, according to one embodiment disclosed herein. As mentioned above, the responses 112 generated by the MGSC 120 might not always be identical to the responses 112 that would be generated by the human-generated service 106 for the same service request 104. As a result, the MGSC 120 might be utilized in conjunction with service requests 104 where an inaccurate response is acceptable. FIGS. 6A and 6B illustrate aspects of the operation of a routing component 602 that might be configured to route service requests 104 to the MGSC 120. The routing component 602 might be a proxy, load balancer, or another type of component configured to route service requests 104 to the MGSC 120 and/or the human-generated service 106 based upon various criteria.

FIG. 6A shows one configuration in which the routing component 602 is configured to route service requests 104 to either the MGSC 120 or the human-generated service 106 based upon one or more criteria associated with an incoming service request 104. For example, the routing component 602 might examine an incoming service request 104 and determine if the service request 104 is suitable for processing by the MGSC 120 (i.e. a possibly inaccurate response is acceptable to the caller) or whether the service request 104 should be routed to the human-generated service 106 (i.e. a possibly inaccurate response to the service request 104 is not acceptable).

Service requests 104 that may be routed to the MGSC 120 for processing include, but are not limited to, service requests 104 received when the corresponding human-generated service 106 is unavailable and where some response to the service request 104 is better than no response, service requests 104 for which an inaccurate response is acceptable to the caller, and service requests 104 that have not been generated by a human being (e.g. the search request has been generated by a search crawler or other type of software robot). In some embodiments, a service request 104 might specify the level of precision required. In this case, the routing component 602 might route the request 104 to the service 106 when a more precise response is required and route the request 104 to the MGSC 120 when a less precise response is acceptable. The MGSC 120 might also be utilized for satisfying other types of service requests 104 in other embodiments. As will be described in greater detail below with regard to FIG. 8, the routing component 602 might also be configured to route a service request 104 to the MGSC 120 if routing the service request 104 to the human-generated service 106 requires a network call and routing the service request 104 to the MGSC 120 does not require a network call.

FIG. 6B shows another configuration in which the routing component 602 routes incoming service requests 104 to the MGSC 120. In this scenario, the MGSC 120 can choose to generate a response 112 to an incoming service request 104 or can choose to pass the incoming service request 104 to the human-generated service 106 for processing. For example, if the MGSC 120 is confident in the classification of the service request 104, the MGSC 120 might elect to provide a response 112 to the service request 104 itself. If the MGSC 120 is not confident in the output of the classifier 122, or classifiers 122, it might pass the service request 104 to the human-generated service 106 for processing.

In the embodiment shown in FIG. 6B, the MGSC 120 might quickly provide a response 112 to a service request 104, but also provide the request 104 to the human-generated service 106 for processing. The response 112 generated by the human-generated service 106 might also be returned in response to the service request 104. In this manner, a quick but potentially inaccurate response 112 might be provided and followed up with a potentially slower, but more accurate response 112 generated by the human-generated service 106. It should be appreciated that the determination as to whether the MGSC 120 should process a particular service request 104 or pass the request 104 to the human-generated service 106 for processing might also be made on other criteria in other embodiments not specifically described above.

It should be appreciated that a feedback loop may exist between the human-generated service 106 and the MGSC 120, regardless of the mechanism utilized to route service requests 104 to either the MGSC 120 and/or the human-generated service 106. This feedback loop allows responses 112 generated by the human-generated service 106 to be passed to the MGSC 120 for continued training of the classifier 122, or combination of classifiers 122, utilized by the MGSC 120. Other mechanisms might also be utilized to continually improve the performance of the classifier 122, or classifiers 122, while the MGSC 120 is being utilized to classify actual service requests 104 directed to the human-generated service 106.

As shown in FIGS. 6A and 6B a feedback loop might also exist between the MGSC 120 and the routing component 602 in some embodiments. This feedback loop might be utilized to provide information to the routing component 602. For example, in the embodiment shown in FIG. 6A, the MGSC 120 might provide a confidence level with regard to a particular service request 104 to the routing component 602. The routing component 602 might then utilize this information to determine whether to route the service request 104 to the MGSC 120 or the human-generated service 106.

Figure 6C:
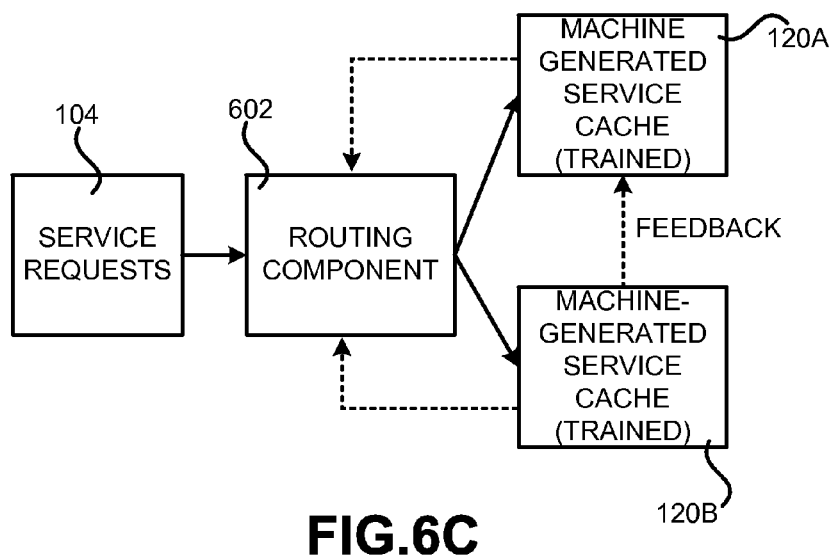
Figure 6D:
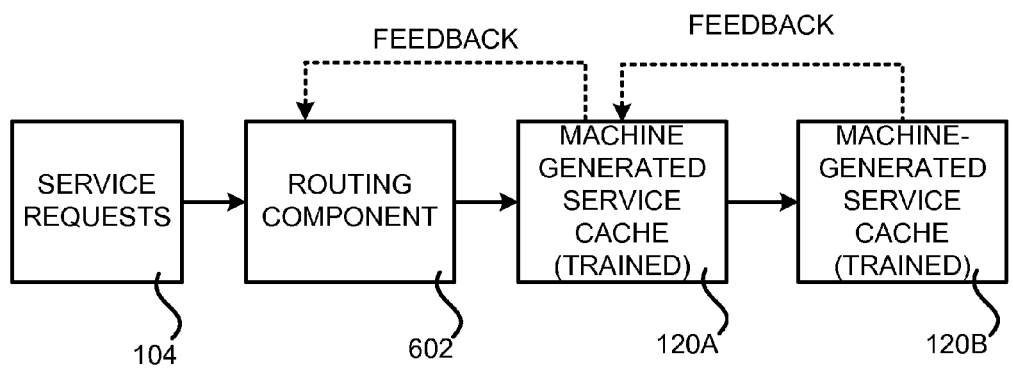

As shown in FIGS. 6C and 6D, the routing component 602 might also be configured to route service requests 104 between multiple MGSCs 120. For example, as shown in FIG. 6C, the routing component 602 might be configured to route service requests 104 to either the MGSC 120A or the MGSC 120B based upon one or more of the factors described above. In the example shown in FIG. 6D, the routing component 602 might route the service requests 104 to the MGSC 120A. In turn, the MGSC 120A might route the service requests 104 to the MGSC 120B based upon one or more of the factors described above.

In the embodiments shown in FIGS. 6C and 6D where there are multiple instances of the MGSC 120, each instance of the MGSC 120 might be configured to share information regarding the classification of service requests 104 with the other instances of the MGSC 120. For example, if one instance of the MGSC 120 is unable to properly classify a service request 104, it might share this information with the other instances of the MGSC 120. In this way, each instance of the MGSC 120 can learn from the classification operations performed by the other instances of the MGSC 120. In other embodiments, the various instances of the MGSC 120 might be configured to foster competition between the instances. Although two instances of the MGSC 120 have been illustrated in FIGS. 6C and 6D, many instances might be utilized in other embodiments.

Figure 7A:
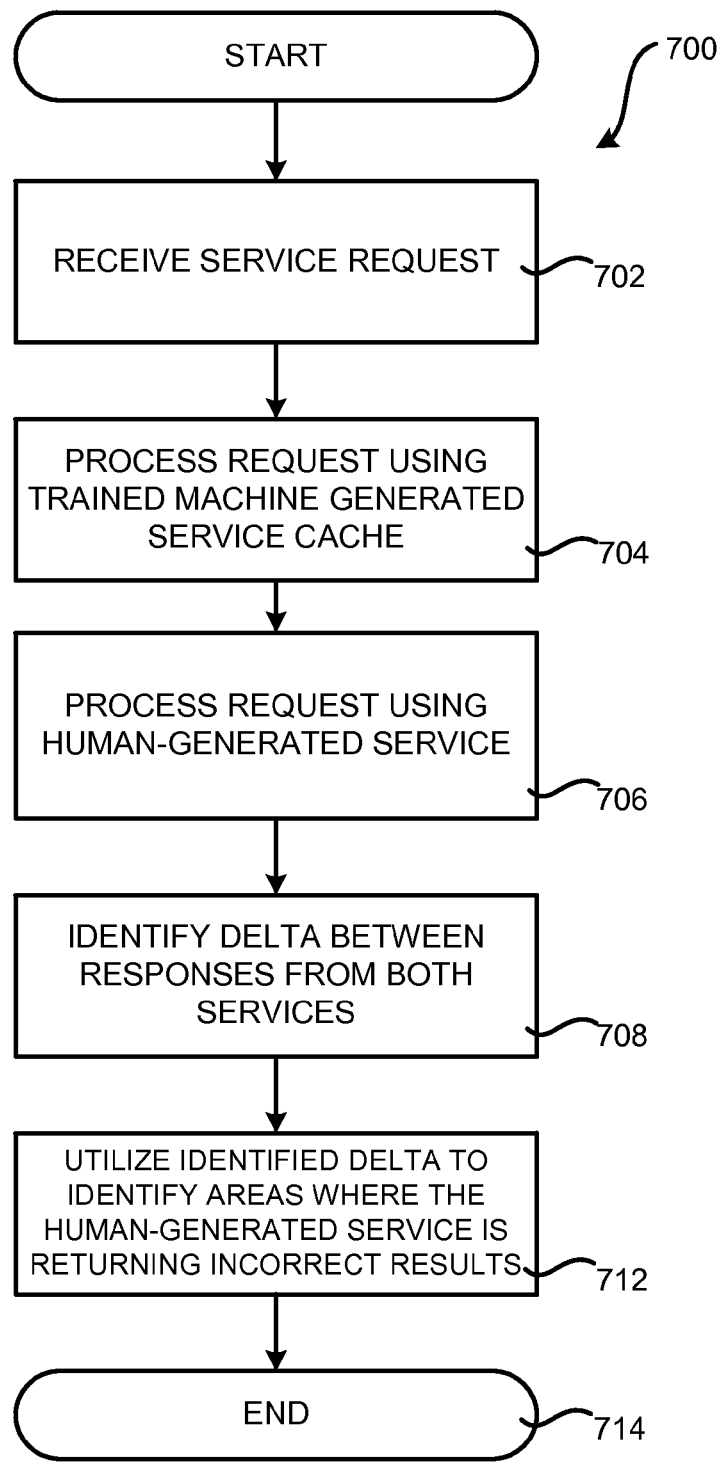
FIGS. 7A and 7B are flow diagrams showing aspects of several illustrative routines for utilizing a machine generated service cache to monitor the operation of a human-generated service, according to one embodiment disclosed herein.
Figure 7B:
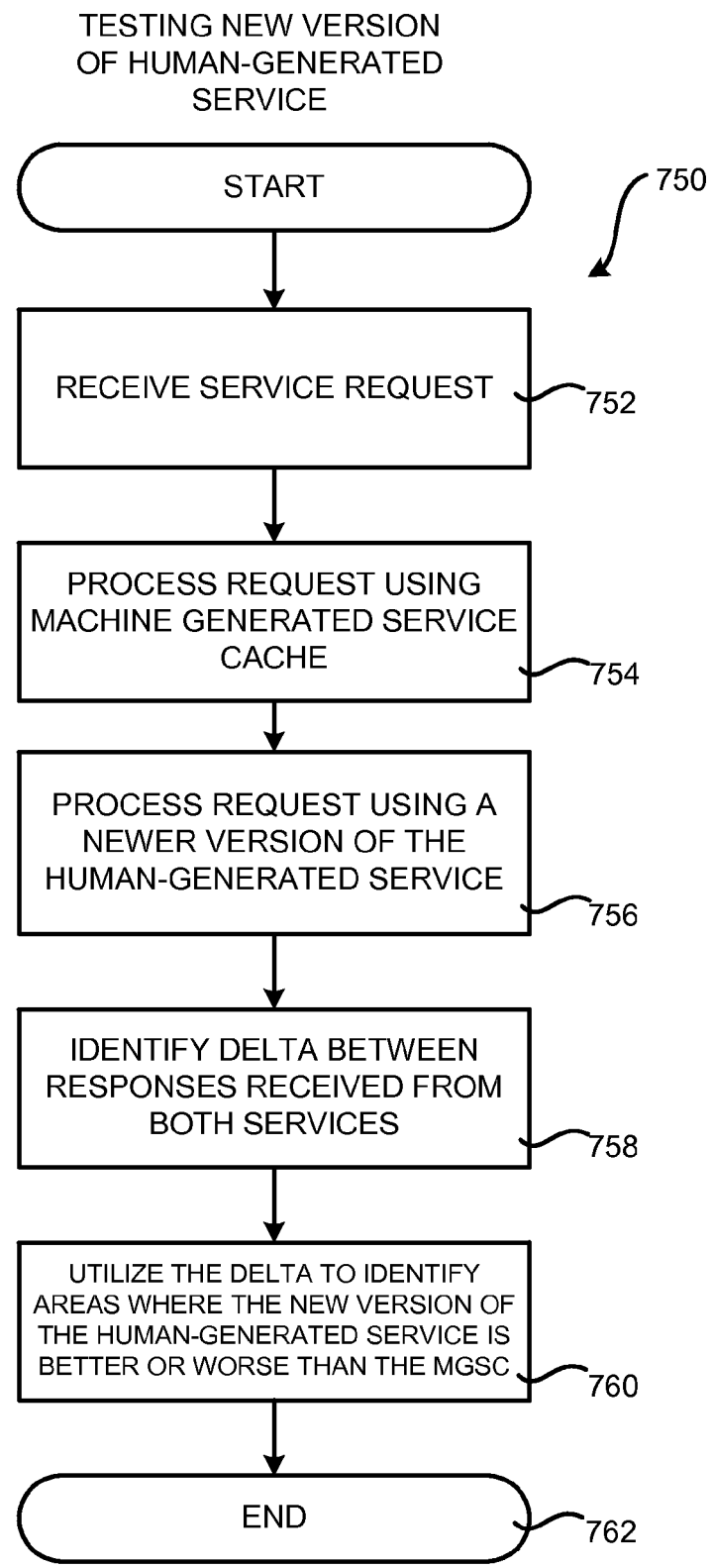

FIGS. 7A and 7B are flow diagrams showing aspects of several illustrative routines 700 and 750, respectively, for utilizing a MGSC 120 to monitor the operation of a human-generated service 106, according to one embodiment disclosed herein. As discussed briefly above, the MGSC 120 might be utilized in some embodiments to locate anomalies in the operation of the corresponding human-generated service 106. The illustrative routines 700 and 750 shown in FIGS. 7A and 7B, respectively, illustrative various aspects of these processes.

The routine 700 begins at operation 702, where a service request 104 is received. The routine 700 then proceeds to operation 704, where the received service request 104 is processed in the manner described above by the trained MGSC 120. The received service request 104 is also processed at operation 706 in the manner described above by the human-generated service 106.

From operation 706, the routine 700 proceeds to operation 708, where any delta between the response 112 provided by the trained MGSC 120 and the response 112 provided by the human-generated service 106 is identified. If there is a difference between the responses 112 provided by the two services 120 and 106, the delta may be utilized at operation 712 to identify one or more areas in which the human-generated service 106 is returning incorrect results. From operation 712, the routine 700 proceeds to operation 714, where it ends.

The routine 750 shown in FIG. 7B illustrates an embodiment wherein the MGSC 120 is utilized to identify areas where a new version of the human-generated service 106 has gotten better or worse against values that the MGSC 120 is predicting. The routine 750 begins at operation 752, where a service request 104 is received. The routine 750 then proceeds to operation 754, where the received service request 104 is processed in the manner described above by the trained MGSC 120. The received service request 104 is also processed at operation 756 by a newer version of the human-generated service 106.

From operation 756, the routine 750 proceeds to operation 758, where any delta between the response 112 provided by the trained MGSC 120 and the response 112 provided by the new version of the human-generated service 106 is identified. If there is a difference between the responses 112 provided by the two services 120 and 106, the delta may be utilized at operation 760 to as a baseline to identify areas where the new version of the human-generated service 106 has gotten better or worse against values that the MGSC 120 is predicting. From operation 760, the routine 750 proceeds to operation 762, where it ends. It should be appreciated that the embodiments illustrated in FIGS. 7A and 7B are merely illustrative and that a MGSC 120 might also be utilized in other ways to locate other types of anomalies in the operation of a human-generated service 106 in other embodiments.

Figure 8A:
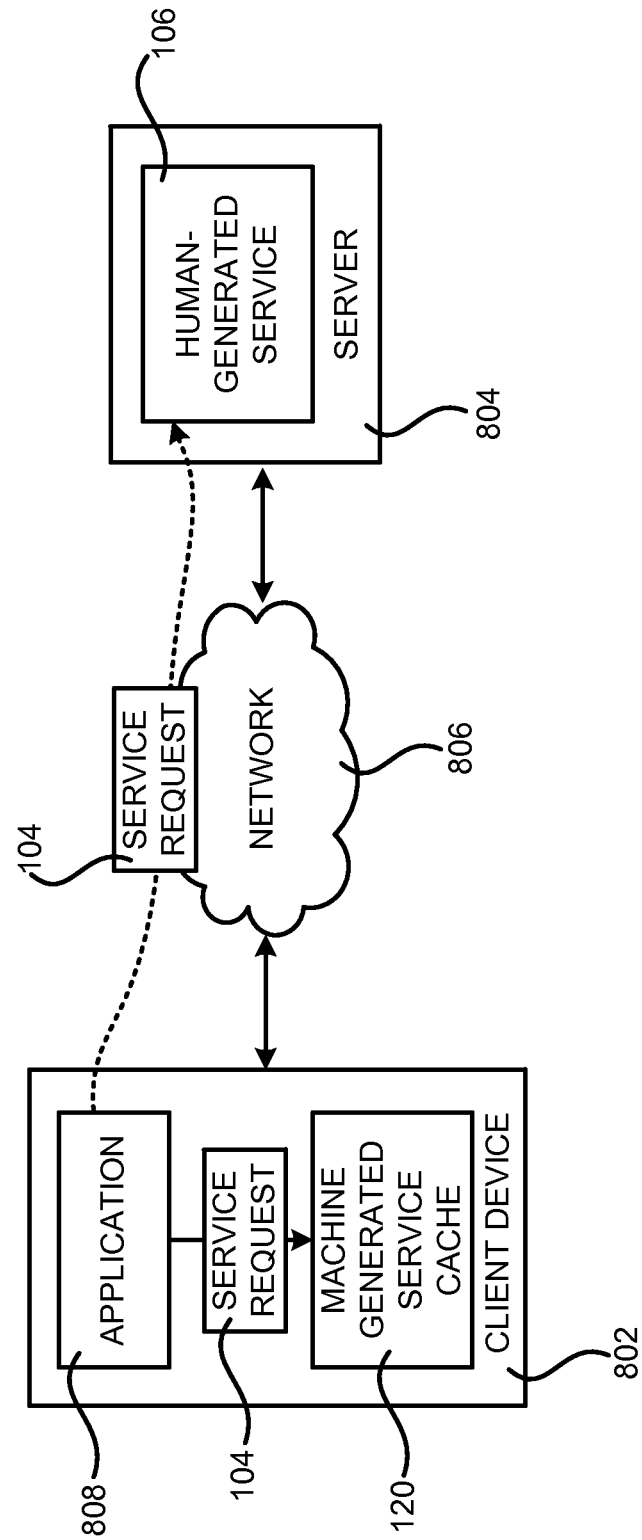
FIGS. 8A and 8B are system diagrams showing aspects of one embodiment disclosed herein for utilizing a machine generated service cache on a computing device to avoid network calls to a remote service, according to one several embodiments disclosed herein.

FIG. 8A is a system diagram showing aspects of one embodiment disclosed herein for utilizing a MGSC 120 on a client device 802 to avoid network calls to a human-generated service 106 executing on a remote server 804, according to one embodiment disclosed herein. In the embodiment illustrated in FIG. 8A, an application 808 is executing on a client device 802 that is configured to submit service requests 104 to the human-generated service 106 and/or the MGSC 120. In this embodiment, the MGSC 120 is executing on a client device 802 that executes the application 808. The client device 802 is connected to a network 806, local area network ("LAN") or a wide area network ("WAN"), such as the Internet. The client device 802 might be a smartphone, a laptop computer, a tablet computing device, or another type of computing device capable of executing the MGSC 120 and of connecting to the network 806.

In the embodiment shown in FIG. 8A, the human-generated service 106 is executed on a server computer 804. The server computer 804 is also connected to the network 806. Through the connection to the network 806, a data communications session can be established between the client device 802 and the server computer 804.

In the embodiment shown in FIG. 8A, the application 808 might generate a service request 104 for the human-generated service 106. In this example, the service request 104 might be routed to the MGSC 120 executing on the client device 802 or to the human-generated service 106 executing on the server computer 804. For example, if routing the service request 104 to the human-generated service 106 would require a call over the network 806, the service request 104 might be routed to the MGSC 120 executing locally on the client device 802 instead.

The routing of the service request 104 might also depend upon the type of the network 806 in other embodiments. For example, if the network 806 is a wired network or WI-FI network, the service request 104 may be routed to the human-generated service 106 for processing. If, however, the network 806 is a wireless cellular network, the service request 104 might be routed to the MGSC 120 executing locally on the client device 802. The service request 104 might also be routed to the MGSC 120 executing locally on the client device 802 if the network 806 is degraded or unavailable. If the network 806 is available and operating normally, the service request 104 might be routed to the human-generated service 106 executing on the server computer 804. The service request 104 might be routed to the MGSC 120 or the human-generated service 106 based upon other criteria in other implementations.

Figure 8B:
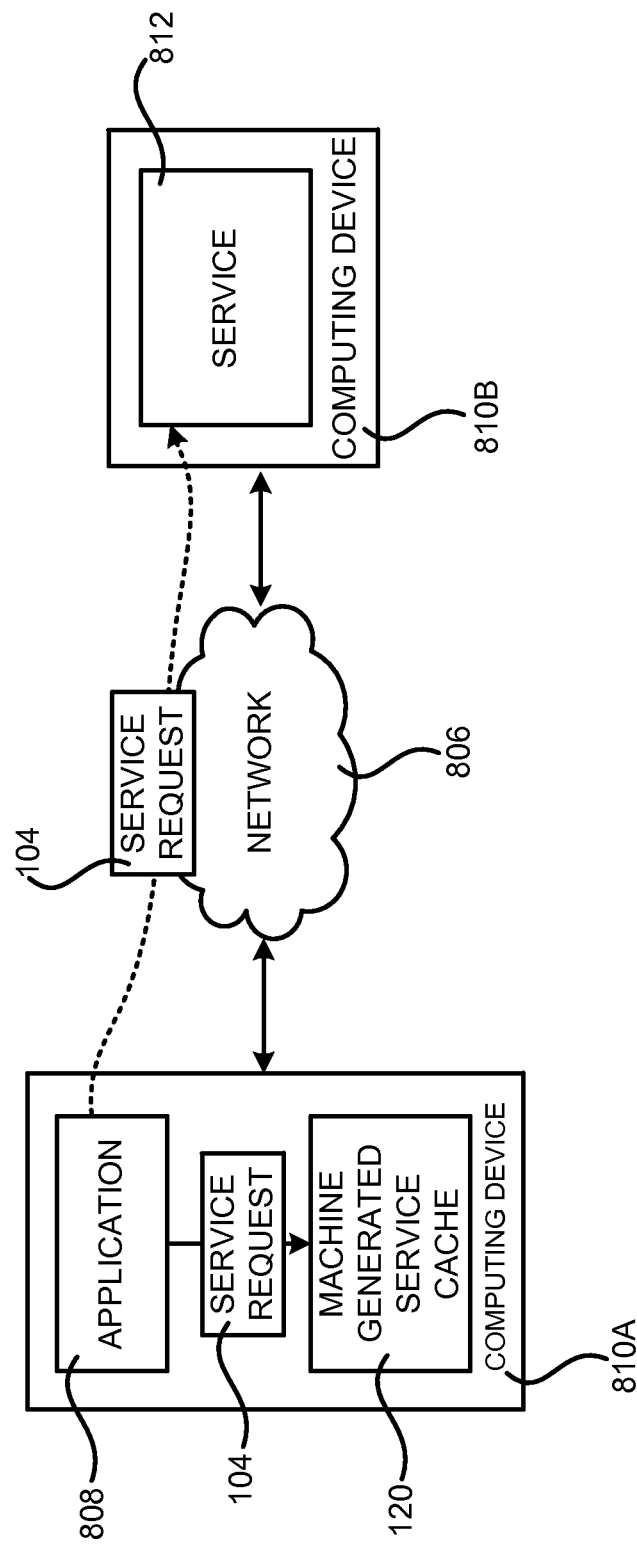

The embodiment shown in FIG. 8A might also be utilized to avoid network calls between two computing devices. For example, and as shown in FIG. 8B, a first computing device 810A might utilize the MGSC 120 to avoid network calls to a service 812 executing on a second computing device 810B. In this embodiment, the computing devices 810A and 810B might be desktop, laptop, or server computers, tablet computing devices, set top boxes, e-readers, game consoles, or virtually any other type of computing device. The service 812 might be a MGSC 120, a human-generated service 106, or another type of service or component. The computing device 810A might utilize the MGSC 120, rather than calling the service 812, depending upon the type of the network 806, the cost of communicating over the network 806, the operational state of the network 806, the operational state of the service 812, and/or one or more other factors.

Figure 9:
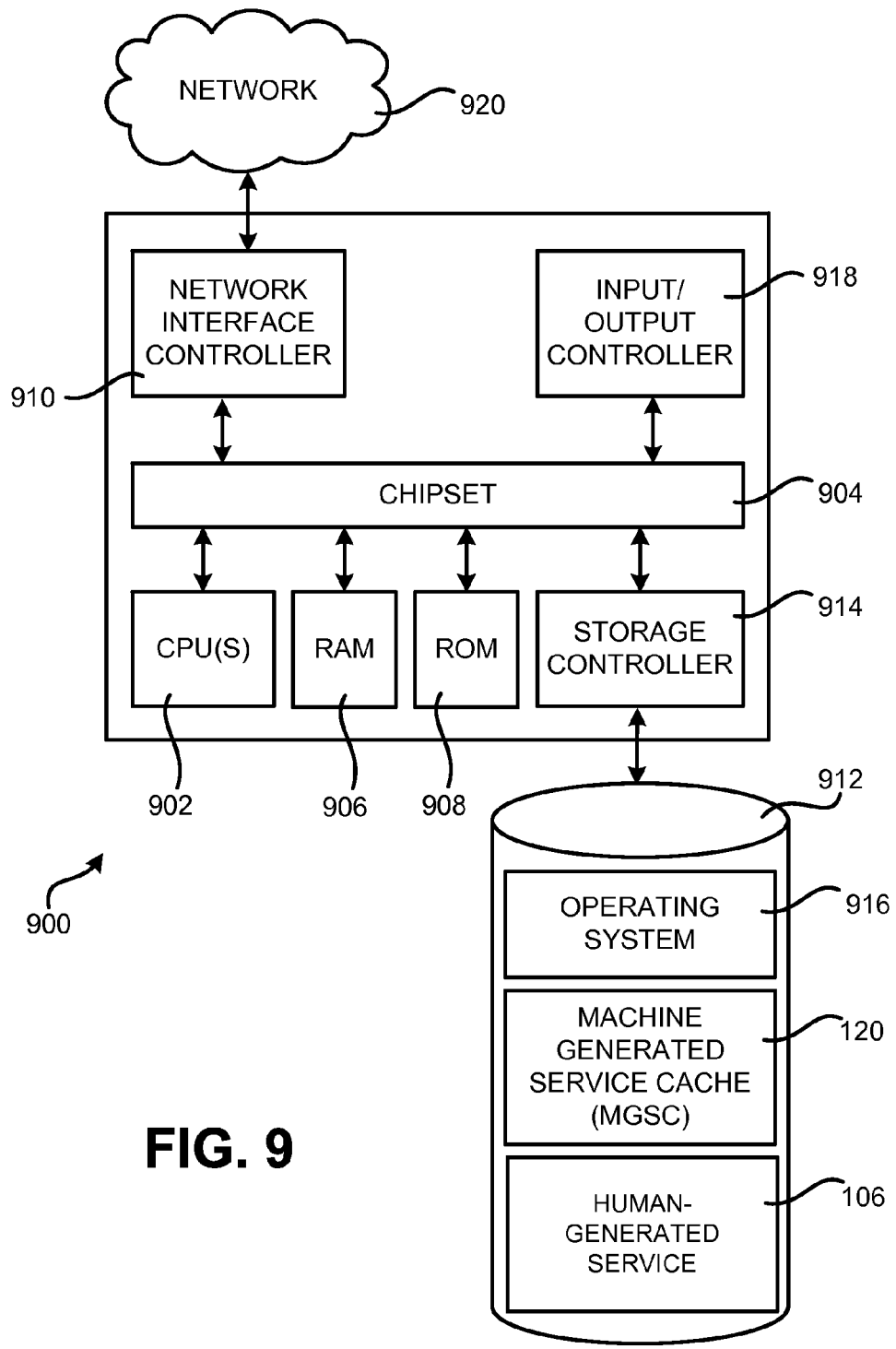
FIG. 9 is a computer architecture diagram showing one illustrative computer hardware architecture for use in computing devices configured to implement the concepts and technologies disclosed herein in one embodiment.

FIG. 9 shows an example computer architecture for a computer 900 capable of executing the software components described herein for creating and utilizing a MGSC 120 to process service requests 104 directed to a human generated service 106 in the manner presented above. The computer architecture shown in FIG. 9 illustrates a conventional server computer, workstation, desktop computer, laptop, electronic book reader, digital wireless phone, tablet computer, network appliance, set-top box, or other computing device. The computer architecture shown in FIG. 9 may be utilized to execute any aspects of the software components described above with regard to FIGS. 1-8.

The computer 900 includes a baseboard, or "motherboard," which is a printed circuit board to which a multitude of components or devices may be connected by way of a system bus or other electrical communication paths. In one illustrative embodiment, one or more central processing units ("CPUs") 902 operate in conjunction with a chipset 904. The CPUs 902 are standard programmable processors that perform arithmetic and logical operations necessary for the operation of the computer 900.

The CPUs 902 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 904 provides an interface between the CPUs 902 and the remainder of the components and devices on the baseboard. The chipset 904 may provide an interface to a random access memory ("RAM") 906, used as the main memory in the computer 900. The chipset 904 may further provide an interface to a computer-readable storage medium such as a read-only memory ("ROM") 908 or non-volatile RAM ("NVRAM") for storing basic routines that help to startup the computer 900 and to transfer information between the various components and devices. The ROM 908 or NVRAM may also store other software components necessary for the operation of the computer 900 in accordance with the embodiments described herein.

According to various embodiments, the computer 900 may operate in a networked environment using logical connections to remote computing devices and computer systems through a network, such as a local-area network ("LAN"), a wide-area network ("WAN"), the Internet, or any other networking topology known in the art that connects the computer 900 to remote computers. The chipset 904 includes functionality for providing network connectivity through a network interface controller ("NIC") 910, such as a gigabit Ethernet adapter.

For example, the NIC 910 may be capable of connecting the computer 900 to other computing devices over a network 920, such as a LAN or a WAN, such as the Internet. It should be appreciated that multiple NICs 910 may be present in the computer 900, connecting the computer to other types of networks and remote computer systems.

The computer 900 may be connected to a mass storage device 912 that provides non-volatile storage for the computer. The mass storage device 912 may store system programs, application programs, other program modules, and data, which have been described in greater detail herein. The mass storage device 912 may be connected to the computer 900 through a storage controller 914 connected to the chipset 904. The mass storage device 912 may consist of one or more physical storage units. The storage controller 914 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 900 may store data on the mass storage device 912 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 912 is characterized as primary or secondary storage, or the like.

For example, the computer 900 may store information to the mass storage device 912 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 912 by detecting the physical states or characteristics of one or more particular locations within the physical storage units.

In addition to the mass storage device 912 described above, the computer 900 might have access to other computer-readable media to store and retrieve information, such as program modules, data structures, or other data. It should be appreciated by those skilled in the art that computer-readable media can be any available media that may be accessed by the computer 900, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 912 may store an operating system 916 utilized to control the operation of the computer 900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 912 may store other system or application programs and data utilized by the computer 900. For instance, the mass storage device may store the MGSC 120, the human-generated service 106, and/or the other software components and data described above.

In one embodiment, the mass storage device 912 or other computer-readable storage media may be encoded with computer-executable instructions that, when loaded into the computer 900, transform the computer from a general-purpose computing system into a special-purpose computer capable of implementing the embodiments described herein. These computer-executable instructions transform the computer 900 by specifying how the CPUs 902 transition between states, as described above. According to one embodiment, the computer 900 has access to computer-readable storage media storing computer-executable instructions that, when executed by the computer, perform the various routines and operations described herein.

The computer 900 may also include an input/output controller 918 for receiving and processing input from a number of input devices, such as a keyboard, a mouse, a touchpad, a touch screen, an electronic stylus, or other type of input device. Similarly, the input/output controller 918 may provide output to a display device, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for creating and utilizing a MGSC to process service requests directed to a human-generated service have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising:
receiving, by a training adapter, a plurality of requests intended for a human-generated service, the training adapter performing the operations of:
extracting one or more input values from a service request of the plurality of requests,
extracting one or more output values from a response to the service request from the human-generated service, and
creating training data based at least partly on the one or more input values and the one or more output values;
providing the training data to a machine generated service cache;
utilizing the training data to train classifiers of the machine generated service cache, the machine generated service cache performing the operations of:
retrieving one or more data values from one or more data sources, and
adding the one or more data values to the training data;
utilizing the training data to evaluate a performance of the classifiers of the machine generated service cache; and
based at least partly on the performance of the classifiers reaching a predetermined level, utilizing the machine generated service cache to process additional requests intended for the human-generated service.

2. The computer-implemented method of claim 1, wherein the training adapter further performs the operation of utilizing a service contract exposed by the human-generated service to extract the one or more input values from the service request and to extract the one or more output values from the response to the service request.

3. The computer-implemented method of claim 1, wherein utilizing the training data to train the classifiers of the machine generated service cache comprises:
selecting a single classifier or a combination of classifiers for use by the machine generated service cache; and
utilizing the training data to train either the single classifier or the combination of classifiers.

4. The computer-implemented method of claim 1, wherein utilizing the machine generated service cache to process the additional requests comprises:
receiving the additional requests intended for the human-generated service at an input translator;
executing the input translator to extract one or more additional input values from the additional requests; and
providing the one or more additional input values to the machine generated service cache as inputs to at least one of the single classifier or the combination of classifiers.

5. The computer-implemented method of claim 1, wherein utilizing the machine generated service cache to process the additional requests intended for the human-generated service comprises:
receiving one or more classifier outputs from the machine generated service cache at an output translator;
executing the output translator to construct a second response to a second service request using the one or more classifier outputs; and
providing the second response based on the service request.

6. The computer-implemented method of claim 4, wherein the input translator utilizes a service contract exposed by the human-generated service to extract the one or more input values from the service requests, and wherein the output translator utilizes the service contract to construct the response to the service request.

7. The computer-implemented method of claim 1, wherein utilizing the machine generated service cache to process the additional requests comprises executing a routing component to route requests to at least one of the machine generated service cache or the human-generated service.

8. The computer-implemented method of claim 7, wherein the routing component performs the operation of routing a request to the machine generated service cache if the human-generated service is unavailable.

9. The computer-implemented method of claim 7, wherein the routing component performs the operation of routing a request to the machine generated service cache if an imprecise response to the request is acceptable.

10. The computer-implemented method of claim 7, wherein the routing component performs the operation of routing a request to the machine generated service cache if the request is not human generated.

11. The computer-implemented method of claim 7, wherein a request specifies a required level of precision, and wherein the routing component performs the operation of routing the request to the machine generated service cache or to the human-generated service based upon the required level of precision specified in the request.

12. A computer-readable storage medium having computer-executable instructions stored thereupon which, when executed by the computer, cause the computer to:
receive a service request directed to a human-generated service;
receive a response to the service request, the response being generated by the human-generated service;
create training data from one or more input values identified in the service request and one or more output values identified in the response to the service request;
provide the training data to a machine generated service cache for use in training one or more classifiers to classify service requests intended for the human-generated service;
select, from the one or more classifiers, at least one of a single classifier or a combination of classifiers for use by the machine generated service cache;
utilize the training data to train at least one of the single classifier or the combination of classifiers; and
utilize the training data to evaluate a performance of the one or more classifiers.

13. The computer-readable storage medium of claim 12, wherein the computer-readable storage medium has further computer-executable instructions stored thereupon which, when executed by the computer, cause the computer to:
split the training data into a training set and a test set;
utilize the training set to train the one or more classifiers; and
utilize the test set to evaluate the performance of the one or more classifiers.

14. The computer-readable storage medium of claim 12, wherein the computer-readable storage medium has further computer-executable instructions stored thereupon which, when executed by the computer, cause the computer to:
determine whether the performance of the one or more classifiers has reached a predetermined level; and
based at least partly on the performance of the one or more classifiers reaching the predetermined level, utilize the machine generated service cache to process service requests intended for the human-generated service.

15. The computer-readable storage medium of claim 12, wherein a service contract exposed by the human-generated service is utilized to:
identify the one or more input values in the service request, and
identify the one or more output values in the response to the service request.

16. An apparatus comprising:
at least one processor; and
a computer-readable storage medium having computer-executable instructions stored thereon which, when executed on the at least one processor, cause the apparatus to:
receive a service request directed to a human-generated service,
route the service request to at least one of the human-generated service or a machine generated service,
extract, based at least partly on a service contract exposed by the human-generated service, one or more input values from the request,
provide the one or more input values to a machine generated service cache as inputs to one or more classifiers,
receive one or more classifier outputs from the machine generated service cache,
construct, based at least partly on the service contract, a response to the service request using the one or more classifier outputs, and
provide the response constructed using the one or more classifier outputs in response to the service request.

17. The apparatus of claim 16, wherein the computer-executable instructions, when executed on the at least one processor, further cause the apparatus to route the service request to the machine generated service cache if the human-generated service is unavailable.

18. The apparatus of claim 16, wherein the computer-executable instructions, when executed on the at least one processor, further cause the apparatus to route the service request to the machine generated service cache if a potentially inaccurate response to the service request is acceptable.

19. The apparatus of claim 16, wherein the computer-executable instructions, when executed on the at least one processor, further cause the apparatus to route the service request to the machine generated service cache if the service request is not human generated.

20. The apparatus of claim 16, wherein the computer-executable instructions, when executed on the at least one processor, further cause the apparatus to route the service request to the machine generated service cache based on a determination that:
routing the service request to the human-generated service requires a network call, and
routing the service request to the machine generated service cache does not require a network call.

21. The apparatus of claim 16, wherein the computer-executable instructions, when executed on the at least one processor, further cause the apparatus to route the service request to the machine generated service cache and the human-generated service, and wherein responses are received from the machine generated service cache and the human-generated service and compared to identify one or more areas where the human-generated service is returning incorrect results.

22. The apparatus of claim 16, wherein the computer-executable instructions, when executed on the at least one processor, further cause the apparatus to route the service request to the machine generated service cache and to a new version of the human-generated service, and wherein responses are received from the machine generated service cache and the new version of the human-generated service and compared to evaluate performance of the new version of the human-generated service.

* * * * *